US 6,205,871 B1

(12) United States Patent
Saloner et al.

(10) Patent No.: US 6,205,871 B1
(45) Date of Patent: Mar. 27, 2001

(54) VASCULAR PHANTOMS

(75) Inventors: David Saloner; Joe Rapp, both of San Francisco, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 09/219,727

(22) Filed: Dec. 22, 1998

(51) Int. Cl.[7] .................. G09B 23/28; G01F 1/00
(52) U.S. Cl. ............... 73/866.4; 73/195; 430/325; 434/268; 600/416
(58) Field of Search ................... 73/866.4, 195, 73/861, 37, 1.16, 1.25, 1.35; 434/268, 267; 324/306, 307, 309; 600/416, 419, 500, 504; 430/325

(56) References Cited

U.S. PATENT DOCUMENTS

| | | | |
|---|---|---|---|
| 2,924,894 | * | 2/1960 | Hellund .............................. 73/37 X |
| 2,987,830 | * | 6/1961 | Jackson ........................... 73/866.4 X |
| 4,554,832 | * | 11/1985 | Hasegawa et al. ............. 73/866.4 X |
| 4,855,910 | * | 8/1989 | Bohning ................................ 324/309 |
| 4,974,461 | * | 12/1990 | Smith et al. ......................... 73/865.6 |
| 5,272,909 | * | 12/1993 | Nguyen et al. ................. 73/866.4 X |
| 5,284,423 | * | 2/1994 | Holdsworth et al. .................. 417/28 |
| 5,396,895 | * | 3/1995 | Takashima et al. ............. 434/268 X |
| 5,406,857 | * | 4/1995 | Eberhardt ........................ 73/865.6 X |
| 5,466,157 | * | 11/1995 | Henderson et al. .................. 434/299 |
| 5,632,623 | * | 5/1997 | Kolff et al. ...................... 73/866.4 X |
| 5,670,708 | * | 9/1997 | Vilendrer ........................ 73/866.4 X |
| 6,018,600 | * | 1/2000 | Levin et al. .......................... 382/284 |

FOREIGN PATENT DOCUMENTS

| | | | |
|---|---|---|---|
| 632351 | * | 9/1982 | (CH) ................................... 434/267 |
| 3301111 A1 | * | 7/1983 | (DE) ................................... 434/267 |
| 2594247 | * | 8/1987 | (FR) ................................... 434/267 |
| 2191884A | * | 12/1987 | (GB) ................................... 434/267 |
| 11-73096 | * | 3/1999 | (JP) . |
| 685294 | * | 9/1979 | (SU) ................................... 73/866.4 |

* cited by examiner

Primary Examiner—Thomas P. Noland
(74) Attorney, Agent, or Firm—Richard Aron Osman

(57) ABSTRACT

The invention provides materials and methods for modeling human blood vessels. Including panels of anatomically accurate vascular phantoms, such as carotid artery phantoms, comprising a range of stenotic conditions and other geometric variations; methods of making anatomically accurate vascular phantoms using stereolithography with an input data set representation of a natural vascular lumenal surface to construct an anatomically accurate vascular phantom comprising a physical representation of the surface; and methods of using the subject phantoms and panels of phantoms, such as methods of measuring a parameter of fluid flow through a panel of anatomically accurate vascular phantoms comprising a range of stenotic conditions.

20 Claims, 2 Drawing Sheets

VASCULAR PHANTOMS

FIELD OF THE INVENTION

The invention is in the field of vascular phantoms for modeling fluid flow.

BACKGROUND

Flow studies with models of vascular geometries are useful for analyzing hemodynamics in complex geometries and for development and validations of imaging methodologies. One of the more widely used imaging techniques is angiography, an invasive technique requiring that a catheter be manipulated into the carotid artery and a radio-opaque dye injected. Angiography actually causes stroke in a small group of patients. Non-invasive techniques, such as ultrasound and magnetic resonance angiography (MRA) may also be used to determine the degree of vascular stenosis. However, the results obtained with these modalities may vary widely between laboratories because of differences in both hardware and technical expertise. The result is that vascular laboratories find themselves increasingly in a situation where they have no independent validation method. Several alternative models have been proposed for the calibration of ultrasound equipment, such as restricted surgical tubing (Anthropomorphic Vascular Phantoms, Shelley Medical Imaging Technologies, Ontario, Canada), moving strings (Doppler QA Phantom System, Nuclear Associates, Carle Place, N.Y.) or vibrating plates (Doppler Sensitivity Phantom, Nuclear Associates); however, these modalities do not test the ability of the equipment to measure velocities in flow regimes comparable to those found in vivo. Accordingly, the present invention provides a series of anatomically accurate, clinically relevant stenosis phantoms, which can be transported between centers, allowing assessment of the accuracy of a given laboratory and providing a dramatic effect on the reproducibility of vascular imaging techniques.

Relevant Literature

Imbesi et al. (1998) Am J Neuroradiol 19, 761–766 describe a lost-wax procedure for making a replica of an ulcerated atherosclerotic human carotid bulb.

SUMMARY OF THE INVENTION

The invention provides a system through which blood-mimicking fluid can be pumped to provide a realistic reproduction of flow conditions in the relevant vascular territories. This system can be used in conjunction with radiological imaging modalities, such as Magnetic Resonance Imaging, Doppler Ultrasound, x-ray angiography, etc. In addition, the system can be used with optical imaging methods such as Laser Doppler Velocimetry, Digital Particle Imaging Velocimetry, etc.

The invention provides anatomically accurate, clinically relevant stenosis phantoms, methods of making and using such phantoms, and graded series of such phantoms. In a particular embodiment, the phantoms are silastic molds of artery lumens, made by stereo lithography based upon data from high resolution imaging, such as MRI (e.g. 200 micron resolution) of atherosclerotic plaques or arteries, (e.g. carotid artery, aorta, renal arteries, etc.) excised at surgery. The flow models produced by this method provide features not available in other flow models. There are no limitations on the geometrical configuration of the vessels unlike other models, which require monotonically varying features, i.e. those other models are unable to produce overhangs as occur in realistic vessels. Because of their geometrical accuracy, the flow conditions in these models are realistic representations of flow conditions in vivo. For example, the phantoms may be used in an apparatus which can duplicate particular blood flow patterns, such as the pulsatile flow wave seen at the carotid bifurcation. Hence, true flow conditions (laminar, disordered, turbulent) as found in vivo are readily reproduced. In addition, background material can be adjusted to provide realistic tissue signals, markers can be inserted to help identify ROIs (Regions of Interest), and panels of multiple models to cover a range of geometric configurations such as stenotic conditions or a range of velocities, can be used.

Commercial applications of these phantoms include validation of ultrasound and MRA. The phantoms can be transported between centers, allowing an assessment of the accuracy of a given laboratory and providing a dramatic effect on the overall reproducibility of these imaging techniques. At present there is no available "gold standard" for determining the accuracy of these imaging modalities. Previous attempts at validation have been in reference to angiography: an approach that is fundamentally flawed because it provides a projection view of the vessels which masks many of the detailed features of the vessel surface. Further, the different modalities are inherently unique one from the other and recent data indicate that both ultrasound and MRA may be more accurate than angiography in determining degree of carotid artery stenosis. Thus, the subject phantoms can be used to check imaging equipment for systematic measurement errors, to provide a measurement of random errors arising from scanner imperfections, to train personnel who use the imaging equipment, as a controlled model that can be used for the development and standardization of new imaging methods and hence improve our ability to accurately define vascular disease such as carotid stenosis and risk of stroke.

In a particular embodiment, the model is constructed as follows:

1. The lumen of the vessel is obtained either at surgery or from cadavers. For example, the lumen can be removed during routine endarterectomy surgery to remove atherosclerotic plaque.
2. The lumen and surrounding tissue is imaged, such as with high resolution three-dimensional Magnetic Resonance Imaging. This is accomplished, for example, using a radiofrequency antenna that accommodates a small syringe containing the specimen immersed in high signal fluid that produces high contrast between the tissue and the lumen. Alternatively, fluid producing no MRI signal can be used to give high contrast.
3. The three dimensional data set is postprocessed to produce a binary image.
4. The binary image is converted into a triangulated representation of the surface, in a format (STL) compatible with stereolithography machines.
5. A solid model of the lumen is obtained using commercial stereolithography.
6. The model is encased in rubber and a rubber mold is made.
7. The mold is injected with wax providing a solid model of the lumen in wax.
8. The wax is embedded in transparent silastic.
9. The wax is dissolved leaving a hollow reproduction of the initial vessel.
10. The wax model is connected to a flow circuit that provides a pulsatile waveform. Preferred flow circuits are inexpensive, easy to use systems, such as described herein and providing realistic pulsatility.

11. Translation tables provide reproducible positioning of ultrasound probe.

Accordingly, the invention provides materials and methods for modeling human blood vessels. In a particular embodiment, the invention provides a panel of anatomically accurate vascular phantoms, such as carotid artery phantoms, comprising a range of stenotic conditions from undiseased vessels with no reduction in flow channel to critically stenosed vessels with a reduction in cross sectional area as great as 99%. In another embodiment, the invention provides methods of making anatomically accurate vascular phantoms using stereolithography with an input data set representation of a natural vascular lumenal surface to construct an anatomically accurate vascular phantom comprising a physical representation of said surface. In a more particular embodiment, the input data set representation is of excised atherosclerotic plaques and/or is derived from high-resolution magnetic resonance imaging. The invention also provides methods of using the subject phantoms and panels of phantoms, such as methods of measuring a parameter of fluid flow through a panel of anatomically accurate vascular phantoms comprising a range of stenotic conditions.

DETAILED DESCRIPTION OF PARTICULAR EMBODIMENTS OF THE INVENTION

Figure 1:
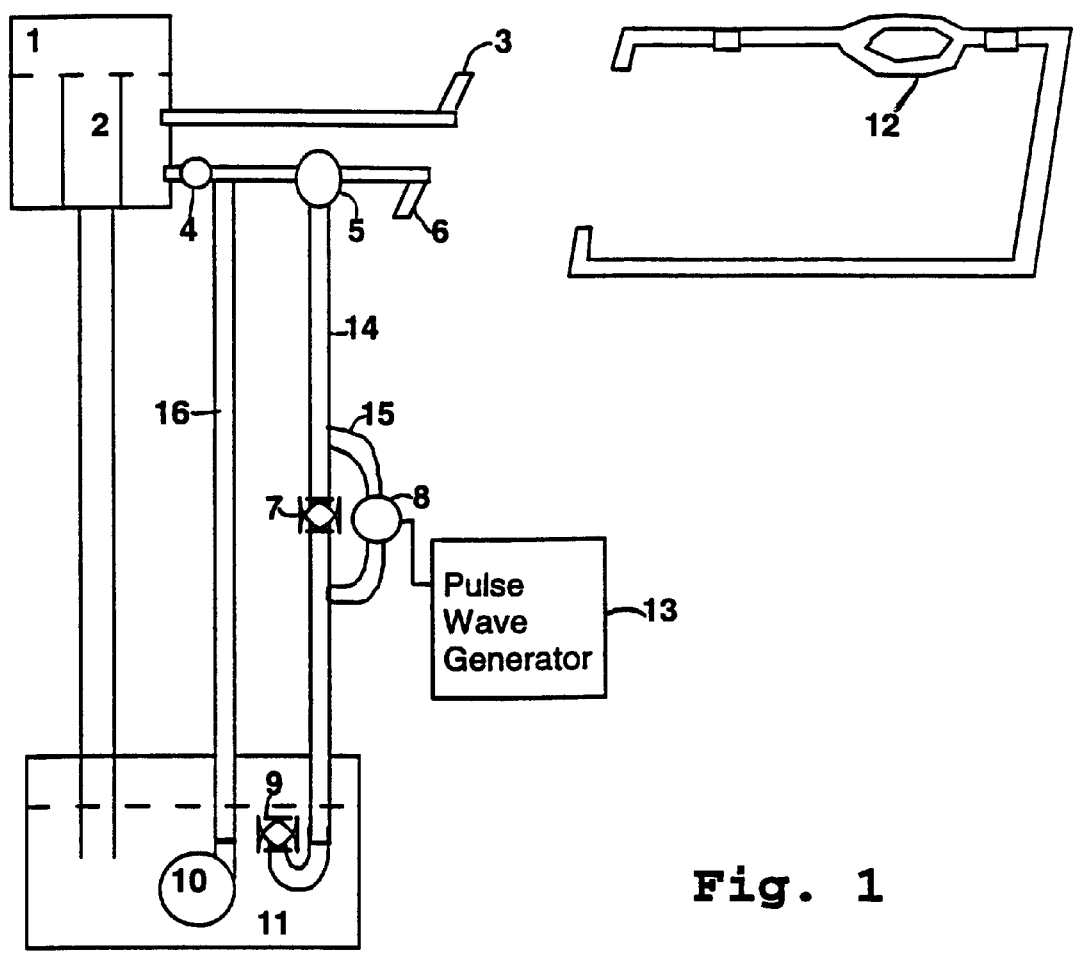
FIG. 1 shows a schematic of a flow model.

The following descriptions of particular embodiments and examples are offered by way of illustration and not by way of limitation.

The invention provides panels of anatomically accurate vascular phantoms. Vascular disease can be characterized by different major features, such as peak velocity (hemodynamic significance), degree of geometrical narrowing (e.g. the reduction in cross-sectional area relative to the undiseased vessel), eccentricity of the channel (the amount the channel is off-center from the principal flow axis), and so on. Different panels are designed to provide variations for at least one of these major features. Stenotic conditions are generally measured qualitatively as mild, moderate, severe, or critical. The compositions of the invention include flow models and systems for modeling fluid flow through vasculature. The subject models provide exact replicas of vascular geometries with appropriate physiological flow conditions. The vessel models are tortuous in three dimensions with overhangs, asymmetries, and irregularities such as are found in vivo. A wide variety of vascular segments may be modeled, preferably segments prone to pathogenic stenosis, such as carotid artery segments, or renal artery segments, or to aneurymal distortion such as basilar tip aneurysms, or abdominal aortic aneurysms. The stenotic range may be expressed in any convenient and reproducible measure. Exemplary ranges may be expressed as percent of relative occlusion, range of peak velocities, amount of eccentricity, degree of non-circularity, or degree of hemodynamic significance. In aneurysms, ranges of aneurysm size, or ranges of the ratio of the width of the neck to aneurysm diameter may be used. Generally, the panel will comprise at least three, preferably at least four, more preferably at least five, more preferably at least six different measures, preferably spanning from zero to 99% stenosis, preferably in approximately equal gradations and providing a representative comprehensive scale of clinical stenosis, i.e. encompassing a full spectrum of clinical stenosis. For example, a carotid bifurcation model can be made with a stenosis resulting in a maximum velocity in the internal carotid artery branch that is 50 cm/s, another with 100 cm/s, and so on in steps of 100 cm/s up to 500 cm/s and spanning the range of peak velocities found in vivo. Exemplary panels are as follows:

| Carotid Panel SR1 | Carotid Panel SR2 | Renal Panel SR1 | Aneurysm Panel SR1 |
|---|---|---|---|
| PH1: 50 cm/s | PH1: +0.25 | PH1: 0.0 | PH1: 0.1 |
| PH2: 100 cm/s | PH2: +0.75 | PH2: 0.5 | PH2: 0.3 |
| PH3: 200 cms | PH3: 0 | PH3: 0.7 | PH3: 0.5 |
| PH4: 300 cm/s | PH4: −0.25 | PH4: 0.85 | PH4: 0.7 |
| PH5: 400 cm/s | PH5: −0.75 | PH5: 0.99 | PH5: 1.0 |

In another embodiment, the invention provides methods of making anatomically accurate vascular phantoms using stereolithography with an input data set representation of a natural vascular lumenal surface to construct an anatomically accurate vascular phantom comprising a physical representation of said surface. A wide variety of stereolithographic methods are known in the art and may be used for such fabrication. Exemplary methods are described in more detail below. Similarly, a wide variety of imaging techniques is known in the art and may be used to generate suitable input data sets. These measurements can be made from vascular territories in vivo, or from excised vascular specimens. Exemplary techniques include high-resolution magnetic resonance imaging, high-resolution intravascular ultrasound, B-mode ultrasound, and high-resolution spiral CT. In a more particular embodiment, the input data set representation is of excised atherosclerotic plaques and/or is derived from high-resolution magnetic resonance imaging.

The invention also provides methods of using the subject phantoms and panels of phantoms, such as methods of measuring a parameter of fluid flow through a panel of anatomically accurate vascular phantoms comprising a range of stenotic conditions. A wide variety of blood flow parameters is known in the art and may be used in the methods. Flow conditions include steady laminar flow where appropriate but also include intermittent flow where there is a transition from laminar to turbulent flow. This provides a suitable challenge for color flow doppler to identify the location of the maximum velocity, and for Doppler ultrasound to determine the correct insonation angle, and to measure the flow velocities (peak systolic, end diastolic, and flow ratios) against a known standard. Exemplary parameters are described above. A wide variety of pumping systems is known in the art and may be used with the disclosed phantoms. Exemplary pumping systems include those described by Holdsworth (1994) U.S. Pat. No. 5,284,423.

Applications of these disclosed flow models (phantoms) and systems include calibration of imaging equipment, training of imaging personnel, development of new imaging approaches, etc. For example, the flow models may be used for the calibration of ultrasound equipment where measurement of flow velocities is used to assess the degree of vascular constriction that is present. Studies using these models have demonstrated that there can be substantial variations of greater than 25% in the velocities that are measured using equipment from different manufacturers and even between different equipment from a single manufacturer.

The flow models can also be used to train inexperienced technologists, and to maintain an ongoing quality assurance program for technologists in a vascular laboratory. For example, it is difficult to train technologists on patients with carotid disease who often find it difficult to remain still for the long times needed for clinical evaluation, and find additional study time needed for the untrained technologist to reproduce the measurements performed by the expert to be an additional burden. The flow models can be used to train technologists permitting them to make measurements on realistic geometries with physiological flow conditions over an extended period, permitting them to explore a wide range of parameters so they can learn the most suitable methods to use in subsequent in vivo studies. A series of "unknown" case studies can be provided to the vascular laboratory on a regular basis so that the technologists can maintain their skill level by measurement against a well-characterized test object.

The flow models can be used in the development of new approaches for imaging modalities such as dynamic x-ray angiography, spiral CT, MR angiography (with and without contrast agents), and evolving ultrasound methods (such as power doppler and contrast bubbles). The models provide a reference in which repeated studies can be performed, parameters can be adjusted, and new techniques can be explored. This is not possible on human subjects where there are additional confounding factors such as breathing, swallowing, and irregular cardiac output, and where repeated contrast agent studies cannot be performed.

The flow models typically include a set of modular components that can be combined for different capabilities. There are six components that will be described below: (1) the pressure head; (2) the pulsatility generator; (3) the flow connectors; (4) the realistic-geometry vascular segment; (5) the fluid; and (6) the ultrasound registration frame.

1. The pressure head. The pressure head provides constant pressure through the flow connectors across the vascular segment. This constant pressure is gravity generated by maintaining a fixed fluid level between an elevated reservoir and a base reservoir. An embodiment of the pressure head is shown in FIG. 1, wherein the elevated reservoir 1 is supplied from the base reservoir 11 through a supply tube 16 and a two-way valve 4 by a continuously operating pump 10. There is an overflow pipe 2 in the elevated reservoir 1. The pump 10 continuously overfills the elevated reservoir 1 and the excess fluid (fluid that does not flow through the tubing system) is returned by the overflow pipe 2 to the base reservoir 11. To fill the flow system, sufficient fluid is added to fill the base reservoir 11 to a predetermined level, to fill the entire tubing system, and to fill the elevated reservoir 1 to overflowing. The difference in fluid level between the fluid level in the base reservoir 11 and in the elevated reservoir 1 then determines the constant pressure head.

2. Pulsatility segment. The pulsatility segment consists of a set of flow tubes connected in parallel through a three-way valve 5 to the flow circuit comprising the outflow tube 3 and the return flow tube 6. One tube (the bypass tube 14) contains a disc 7 with a fixed orifice. This provides a constant component of flow. Each of the other parallel tubes has a solenoid valve 8 that opens and closes an orifice when driven by a pulse wave generator (PWG) 13. The provision of multiple tubes with solenoid valves in parallel with the fixed orifice tube gives flexibility in designing details of the pulsatile waveform. However, the simplest configuration for the pulsatility segment is to have a single solenoid valve tube 15 in parallel with the fixed orifice bypass tube 14 and that is described here. The orifice size of the steady flow bypass tube 14 can be selected relative to that of the solenoid valve tube 15 to provide the desired ratio between peak flow (fully open solenoid valve) and steady flow.

The sizes of the orifice in the bypass tube 14 and of the orifice in the solenoid tube 15 only control the ratio of the flow rate in systole to that in diastole. The specific flow rates that are achieved in the vascular segment can then be adjusted by inserting a disc 9 with a fixed orifice across the tube distal to the junction of the bypass tube 14 and solenoid tube 15. A series of discs with calibrated orifices are available which can be rapidly interchanged and which can reduce the flow rate from a peak (no disc), to elimination of flow (no orifice in the disc).

The opening and closing of the solenoid valve 8 is controlled by a PWG 13. This generator 13 has two adjustable dials (ten turn potentiometers) for the solenoid valve 8 one of which determines the interval between one pulsatile cycle and the next, and the other which determines the duration of the interval during which the valve 8 is open. In addition, the solenoid valve 8 can be set to be either permanently open or permanently closed. An output signal is provided from the generator 13 to the solenoid valve 8. A long extension cord permits operation of the solenoid valve 8 with the PWG 13 at a position remote from the flow system (e.g. this permits adjustment of the pulsatility from the operator's console of an MR scanner). The output from the PWG 13 has a surge suppression circuit to prevent reflected waves causing spurious triggers.

The PWG 13 also provides an output signal for synchronizing measurements with the pulsatility cycle. This signal can be generated either as a TTL (transistor-transistor logic) signal or at the level of the signal generated physiologically by the cardiac ECG (electrocardiogram) signal, and can thus be used to trigger devices such as an MR scanner.

As shown in the table below, coordinating the positions of the two-way valve 4 and the three-way valve 5 provides different functionalities to the flow.

| Two-Way Valve 4 Setting | Three-Way Valve 5 Setting | Flow Functionality |
| --- | --- | --- |
| up/down | left/up/right | Flush bubbles out of flow circuit |
| up/down | left/up/down | Flush bubbles out of pulsatility segment |
| left/right | up/right/down | Operational setting |

3. The flow connectors are connected by "quick disconnects" to the elevated reservoir 1. The connections are on a common axis that permits the flow circuit to be pivoted about that axis to permit air bubbles to rise to one or other of the end of the circuit facilitating flushing of the air bubbles out of the flow circuit.

Figure 2A:
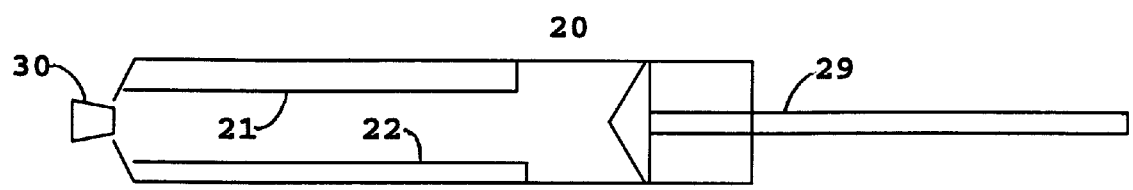
FIG. 2A–2C show a schematic of a specimen containment system used for imaging.
Figure 2B:
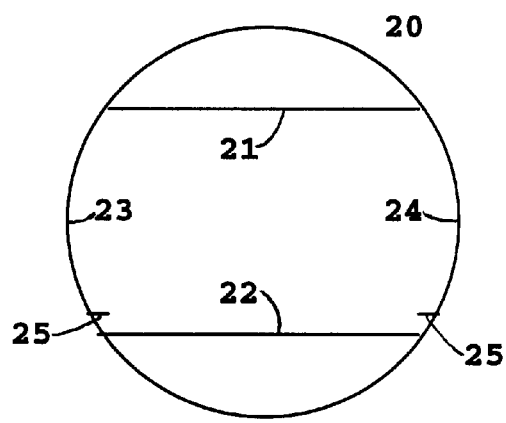
Figure 2C:
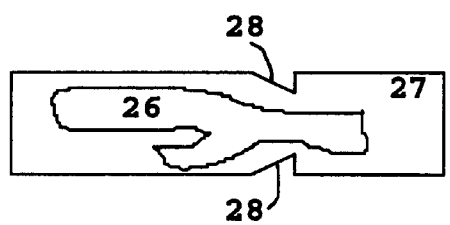

4. The realistic-geometry vascular segment 12 connects the outflow tube 3 and the return flow tube 6. The representation of the vasculature of interest is produced from a digital representation of the vasculature of interest. The geometry of the vessel of interest can be provided by any three-dimensional imaging modality. This can be obtained either from in vivo studies of the vessels, from ex vivo studies of surgical specimens resected from blood vessels and which contain within them the contours of the blood channel of interest, or from blood vessels taken from cadavers. Ex vivo studies permit higher resolution imaging than does in vivo imaging. The specimens do not move and can be imaged over extended periods, which permits good differentiation of the blood channel from the surrounding tissue. One specific imaging modality used to image the vessels is Magnetic Resonance Imaging. A dedicated radiofrequency coil is employed to image the specimens with a high signal to noise ratio. As shown in FIGS. 2A–2C, the specimens are placed in a custom-made cylinder 20 similar to a 20 cc syringe. The cylinder 20 has a cross-section as shown in FIG. 2B.

The cylinder 20 has a 12 mm space between the plane 21 at the top and the parallel plane 22 at the bottom. The distance between the left 23 and the right 24 curved surfaces is 20 mm. There are guide rails 25 close to the bottom plane 22.

The specimen 26 is attached to a mylar sheet 27 using a tiny drop of cyanoacrylate glue. The mylar sheet 27 has triangular notches 28 cut in either side to serve as fiducial markers. The specimen 26 on the mylar sheet 27 is then immersed in a solution of doped saline containing 1 part in 300 of Gd-DTPA, an MRI contrast agent. A small syringe with a needle is used to gently flush out the blood channel to clear it of superficial blood and to rinse out air bubbles. The cylinder 20 is then submerged in the doped saline, and the specimen 26 is slid into the bore with the mylar sheet 27 slotted into the guide rails 25. A plunger 29 is fitted into the one end of the cylinder and pushed in to its terminus. The orifice at the other end of the cylinder is then corked with a seal 30 to make it watertight.

The cylinder 20 is then fitted into a custom-made radiofrequency coil. This coil is a solenoid coil with the windings of the coil spiraling around a thin plastic cylinder that is just large enough to accommodate the cylinder. There are tune-and-match capacitors which permit the frequency of transmission and reception of the radiofrequency signal to be matched to that of the saline when it is placed inside an MRI scanner. The cylinder 20 is inserted within the coil with the parallel planes aligned with the horizontal plane of the scanner, and the longitudinal axis oriented at right angles to the longitudinal axis of the magnet.

The specimen 26 is then imaged with a high resolution three dimensional gradient echo recalled sequence. The sequence provides a 50 mm×25 mm field of view with a matrix of 256×128 and a 12.5 mm thick slab with 64 partitions. This provides images with a spatial resolution of 195 microns in all three dimensions. Zero-filled interpolation is used to provide images on a display matrix with half the pixel size in each dimension. Other imaging parameters are TR=35 ms, TE=11 ms, flip angle=35 E. (Alternatively, a three dimensional fast spin echo sequence can be used with the same resolution but smaller susceptibility artifacts at the cost of longer total imaging times).

The acquired three dimensional data set is post-processed on a slice-by-slice basis using thresholding to identify the signal from the doped saline in the flow channel which is high intensity relative to the lower intensity signal from the atheromatous tissue. The coordinates of the pixels on the edge of the flow channel then represent the surface contours of the flow channel. The length of the bifurcation from the specimen data is typically about 4 cms long. The actual geometries at the bifurcation is then matched to idealized representations of the common, internal, and external carotid arteries by interpolating from the true cross sections to circular cross sections with appropriate dimensions for undiseased bifurcation vessels. The data representing the surface contours are converted into .STL format and provided to a commercial stereolithography company which reproduces the geometry of the flow channel in a solid acrylic piece.

The solid acrylic piece is oriented with the plane of the bifurcation horizontal, and is suspended about 1.5 cm above the bottom of a small container or boat. The container is filled to the level of the plane of the bifurcation with room temperature vulcanizing rubber compound. Registration pins are placed perpendicular to the bottom of the boat. The rubber compound is allowed to set. The container is then filled with an additional depth of 1.5 cm of rubber compound which is allowed to set. The rubber mold is then removed from the boat and is separated into its two halves, and the solid acrylic piece is removed. The two halves are placed back into the boat, using the registration pins and the form of the boat to ensure registration. Circular holes are cut into the sides of the boat matching the outlets of each of the three arms of the bifurcation. The bifurcation is oriented vertically, with the "common carotid artery branch" at the bottom, and molten jeweler's wax (or low temperature melting point metal) is injected by syringe into the "common carotid artery" until it exits from either one of the other bifurcation branches. That branch is then plugged with a stopper and injection is continued until the material flows out of the other branch. That branch is plugged and the model is inverted and allowed to cool. The two rubber halves are then separated and the wax (or Imp metal) solid reproduction of the vascular lumen is removed.

Holes are cut into the sides of a new boat at positions matching each of the bifurcation arms. Flow connectors are inserted through these holes, and the wax (or Imp metal) piece is suspended above the boat with each arm slotted into its corresponding flow connector. All holes are sealed, and the boat is filled with silastic, covering the solid piece to a depth of 1 to 2 cm. The silastic is allowed to set, and the wax (or Imp metal) is then melted out of the solid silastic. The final model is then realized as a hollow channel in a silastic block with connectors on each bifurcation branch which enables the rapid insertion of the model in the flow circuit.

5. The fluid. A fluid mixture is used that provides the hemodynamic properties of blood (3 centipoise), and has the same imaging parameter behavior as blood. A solution of 40% glycerol to 60% water by volume is used. For ultrasound, small beads (15 microns in diameter) are used to provide scattering. The T1 value of this mixture is similar to that of blood at 1.5 Tesla.

6. The ultrasound registration frame. A registration frame is provided so that ultrasound measurements can be made in reproducible locations. The frame consists of a plexiglass square that can be fitted over the vessel geometry in, a fixed location. A circular disc with a rectangular slot in the center can be translated along either the x (left-right) axis or the y (head-foot) axis. The rectangular slot is designed to accommodate the ultrasound transducer, and contains within it a 30 E wedge that permits selection of a suitable insonation angle. Once the disc is in the correct location, it can be rotated to a specified angle to align it with the known location of interest. Final selection of the insonation volume is under user guidance, as transducer size variation between different machines does not permit a one-to-one matching of position.

EXAMPLES

Carotid Bifurcation Models for Validation of MR and DUS (Doppler Ultrasound)

We manufactured a set of vascular models based on endarterectomy specimens that are removed from the carotid bifurcation. These specimens were carefully removed in one intact piece and contain within them the residual carotid bifurcation lumen that was present in the subject prior to surgery. Each specimen is placed in a small syringe of Gd-doped saline, and imaged using three dimensional MRI. A high sensitivity RF (radiofrequency) coil is used and high resolution images are obtained. The vascular lumen is depicted with high contrast to the neighboring plaque, and the coordinates of the lumenal surface can be segmented out from the 3D data set. This surface is then used to create a physical model of the lumen.

The lumenal model is realized as a hollow volume in a silastic block. The silastic was chosen as it is compatible with DUS, MRA, and CA (cather-injected x-ray angiography) although other materials can be used if desired. The resulting models are faithful reproductions of the actual residual lumen that is in the patient prior to surgery. A series of models were created each based on a specimen resected en bloc from a patient. Patients with different degrees of stenosis were included. These models are interchangeable in the pulsatile flow circuit. Not only do they contain the appropriate tortuosity and stenoses, they also accurately reflect the presence of overhangs and asymmetrical ulcerations into the plaque that are often encountered in vivo.

A pulsatile flow generator was constructed to create flow waveforms that were reasonable characterizations of in vivo flow. The emphasis of this development was to provide an inexpensive yet robust system. The flow generator is a gravity-fed reservoir system. The tube to the CCA inlet is supplied by a system of two parallel valves, one of which provides a constant component of steady flow, and the other of which is a solenoid valve providing a pulsatile flow component. The pressure drop across the bifurcation model is determined by the height of the supply reservoir which is kept fixed for all bifurcation models. Each bifurcation model contains an orifice in the branches corresponding to the CCA (common carotid artery), ICA (internal carotid artery), and ECA (external carotid artery). These orifices are adjusted so that when placed in the flow circuit the velocities in the CCA, ICA, and ECA are in reasonable correspondence with the degree of stenosis present in the models.

The fluid used in the phantoms is a mixture of water and glycerol which has a viscosity similar to that of blood at the ambient temperature under which measurements are made. The mixture is seeded with small spherical scatterers to provide a SUS signal. From a Magnetic Resonance Imaging perspective, the TI value for the mixture is also similar to that for blood in vivo at 1.5 T.

The silastic phantom is sonolucent and high contrast color flow images are obtained from the fluid. Measurements were made to determine whether there were any systematic differences between different US scanners. Blood-mimicking fluid was pumped through the models with waveforms similar to those in vivo. Fluid flow differed with peak velocities in the ICA corresponding to the range from moderate to critical stenosis. In each of four flow models, peak systolic and end diastolic velocities were measured in the CCA, the ECA, and at the location of the peak velocity in the ICA, using eight different ultrasound machines from four different manufacturers. A translation stage was used to ensure that repeated measurements were matched by location.

Velocity measurements from each scanner were correlated with that of the mean of all scanners using a linear fit. Variation between different scanners was substantial ranging from 13.2% higher than the mean to 9.3% lower than the mean. Using the values from the linear fit to recalibrate the different scanners reduced the standard error of measurement by 13.4%. In the flow model with the highest ICA velocity, two scanners were unable to identify the jet by color Doppler and spuriously low velocities were measured.

The flow system was modified by including 10 feet lengths of rigid tubing in the inlet and outlet arms of the phantom. This permitted introduction of the phantom into the center of the magnet while keeping the solenoid valve sufficiently far from the magnet that the magnetic field did not affect the valve performance. Images were acquired using standard MR imaging sequences on the different flow phantoms. Images were acquired for a variety of flow conditions. These included regular pulsatile flow with and without gating of the MRA. In addition, images were acquired with steady flow either with flow velocities corresponding to peak systole, or to end diastole.

Images from the phantoms were qualitatively similar to those acquired in vivo. Displacement artifacts and signal loss from disturbed flow were noted, the extent of which depended on the specific pulse sequence used, and the flow velocities studied. We found these geometrically realistic phantoms useful tools for the understanding of flow effects and their influence in MR and DUS measurements. These models permit calibration of US machines, reducing between-machine variability in velocity measurements. Calibration is made with laminar and disordered flow, as is experienced clinically. Variation in peak velocities was found using different models of US scanners, both between manufacturers and within manufacturers. In addition, the models provide useful tools to analyze MR image appearance with realistic flow conditions and also permit an independent validation of the flow conditions by optical methods.

All publications and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A panel of anatomically accurate vascular phantoms comprising a range of stenotic conditions varying from normal to critically stenosed (0% area reduction to greater than 99% reduction).

2. The panel of claim 1 wherein the phantoms are selected from carotid artery phantoms, renal artery segments, basilar tip aneurysm phantoms, and abdominal aortic aneurysm phantoms.

3. The panel of claim 1 wherein the panel provides a representative comprehensive scale of clinical stenosis.

4. The panel of claim 1 wherein the panel provides a representative comprehensive scale of clinical stenosis as measured by peak velocity.

5. A method of making a panel of anatomically accurate vascular phantoms according to claim 1 comprising the step of using stereolithography with an input data set representation of a natural vascular lumenal surface to construct an anatomically accurate vascular phantom comprising a physical representation of said surface, and repeating said step to make the panel.

6. The method of claim 5, wherein the input data set representation is derived from high resolution magnetic resonance imaging.

7. The method of claim 5, wherein the input data set representation is of excised atherosclerotic plaques.

8. The method of claim 5, wherein the input data set representation is derived from high resolution magnetic resonance imaging of excised carotid artery atherosclerotic plaques.

9. A method of measuring a parameter of fluid flow through anatomically accurate vascular phantoms, comprising the step of flowing a fluid through a panel according to claim 1 and measuring a parameter of flow of the fluid through each of the phantoms.

10. The method of claim 9, wherein the parameter is selected from peak systolic flow velocity, end diastolic flow velocity and a ratio of peak systolic and end diastolic flow velocities.

11. The method of claim 9, wherein the measuring comprises Dopplar Ultrasound (DUS), magnetic resonance angiography (MRA) or cather-injected x-ray angiography (CA).

12. The method of claim 9, wherein the panel comprises at least five different measures; the range of stenotic conditions is in approximately equal gradations providing a representative comprehensive scale of clinical stenosis; and each phantom of the panel is made of a silastic compatible with Dopplar Ultrasound (DUS), magnetic resonance angiography (MRA) and cather-injected x-ray angiography (CA).

13. The panel of claim 1, wherein the phantoms model a vascular segment prone to pathogenic sclerosis selected from the group consisting of a carotid artery segment and a renal artery segment.

14. The panel of claim 1, wherein the phantoms model a vascular segment prone to aneurymal distortion selected from the group consisting of a basilar tip aneurysm and an abdominal aortic aneurysm.

15. The panel of claim 1, wherein the stenotic range is expressed as percent of relative occlusion, range of peak velocities, amount of eccentricity, degree of non-circularity, or degree of hemodynamic significance.

16. The panel of claim 1, wherein the stenotic range is expressed as aneurysm size, or the ratio of the width of the neck to aneurysm diameter.

17. The panel of claim 1, wherein the panel comprises at least five different measures.

18. The panel of claim 1, wherein the range of stenotic conditions is in approximately equal gradations providing a representative comprehensive scale of clinical stenosis.

19. The panel of claim 1, wherein each phantom of the panel is made of a silastic compatible with Dopplar Ultrasound (DUS), magnetic resonance angiography (MRA) and cather-injected x-ray angiography (CA).

20. The panel of claim 1, wherein the panel comprises at least five different measures; the range of stenotic conditions is in approximately equal gradations providing a representative comprehensive scale of clinical stenosis; and each phantom of the panel is made of a silastic compatible with Dopplar Ultrasound (DUS), magnetic resonance angiography (MRA) and cather-injected x-ray angiography (CA).

* * * * *

UNITED STATES PATENT AND TRADEMARK OFFICE
CERTIFICATE OF CORRECTION

PATENT NO.   : 6,205,871 B1
DATED        : March 27, 2001
INVENTOR(S)  : David Saloner et al.

It is certified that error appears in the above-identified patent and that said Letters Patent is hereby corrected as shown below:

<u>Column 1,</u>
Line 7, insert the following -- The research carried out in the subject application was supported in part by NIH Grant # HL-50323. The government may have rights in any patent issuing on this application. --

Signed and Sealed this

Fifth Day of February, 2002

Attest:

JAMES E. ROGAN
*Attesting Officer*        *Director of the United States Patent and Trademark Office*